United States Patent Office 3,671,300
Patented June 20, 1972

3,671,300
NYLON MOLDING ARTICLES AND PROCESS FOR PRODUCING THE SAME
Takao Kawakita and Hirosaka Ikeda, Osaka, Shigeru Matsumura, Hyogo, and Kunihiko Taniguchi, Osaka, Japan, assignors to Sumitomo Electric Industries Ltd., Osaka, Japan
Filed Nov. 14, 1968, Ser. No. 775,595
Claims priority, application Japan, Nov. 14, 1967, 42/73,476
Int. Cl. B44d 1/09, 1/02
U.S. Cl. 117—118
6 Claims

ABSTRACT OF THE DISCLOSURE

Nylon molding article having an addition or cross-linking reaction product layer on at least the surface thereof produced by treating the molded nylon article with an epoxy compound, an isocyanate compound, a ketene or a carbodiimide. Inorganic bulking agents may be included.

Process for forming the nylon molding article comprises treating the article by heating the article in a fluid comprising one of the above-recited compounds.

BACKGROUND OF THE INVENTION

Field of the invention

This invention relates to improvement in nylon molding articles and a process for producing the same. The molding articles find special use as the ball holder of a ball-point pen, as a gear, a cam, etc.

Description of the prior art

In general, nylon resins have been used not only in the form of fibers, but also as machine parts, sliding members and structural materials, usually in place of metallic materials. However, in certain areas, the characteristics of the synthetic resins, such as mechanical strength, heat resistance and frictional resistance are very poor as compared with metals. This is true of nylon.

Improvements in the mechanical strength of nylon have been carried out by employing a bulking agent, such as glass fibers. Improvements in the friction resisting property of nylon has been carried out by filling with a solid lubricant such as molybdenum sulfide, graphite, etc. In addition, an improvement in these characteristics has been carried out by finely crystallizing the nylon.

However, the improvements obtained by following the above methods causes lowering of other desirable characteristics, for example, a lowering of the friction resisting property in nylon strengthened by the use of glass fibers is noted, and though the friction resisting property is improved by filling the nylon with a solid lubricant such as $MoS_2$, the mechanical strength thereof is often lowered.

The following methods have also been suggested in order to improve the characteristic fault of the synthetic resins heretofore described.

(1) By using a bulking agent:
  (1) Selection of the shape and granular size of the bulking agent;
  (2) Selection of the specific material of the bulking agent;
  (3) Treatment to chemically bind the bulking agent and the nylon in order to improve adhesion between the bulking agent and the nylon, whereby the tensile strength is increased;

Examples
  (1) Borane treatment of glass fibers,
  (2) Silane treatment of a metal powder.
  (3) By designing the shape of the molding to overcome the above faults;

(4) By controlling the crystal structure of the molding by a heat treatment;
(5) By chemical reaction of the nylon to cause cross-linking.

The amide radicals in nylon will react chemically under certain select reaction conditions, though the reactivity thereof is poor. As compounds which will react with the amide radicals in nylon, there are isocyanates, isothiocyanates, imines, epoxy compounds, ketenes, carbodiimide, etc. All of these are supposed to react with active hydrogen

in the amide radical.

The present invention offers a process which allows the rigidity, friction resisting property and water and asborbing property of a nylon molding article to be remarkably increased. The process is very simple and is defined in the specification.

SUMMARY OF THE INVENTION

The inventors have found a process for increasing the rigidity, friction resisting property and water absorbing property of a nylon molding article by a simple process which comprises maintaining the nylon molding article in a compound from the group consisting of epoxy compounds, isocyanate compounds, ketenes, carbodiimide, isothiocyanates and amines. In general, the "poly" forms of the above compounds, where appropriate, may also be utilized. The reaction conditions contemplated are defined in the specification, it being appreciated, of course, that the main object of the present invention is to provide a novel molding article which has an addition or cross-linking reaction product layer on at least one surface thereof produced by treating the molded nylon article with the above compounds.

The invention further comprises a nylon molding article which is produced by the above process. In a preferred form, the nylon molding article contains inorganic bulking agents, which are most preferably metal powders and glass fibers.

Accordingly, an object of the present invention is to provide nylon molding articles having an increased mechanical strength, and which are able to endure severe conditions of usage.

A further object of the present invention is to provide nylon molding articles which have excellent moldability, can be produced for a low price, and which may be formed by a very simple reaction utilizing simple apparatus.

A still further object of the present invention is, of course, to produce nylon molding articles which illustrate an excellent mechanical strength, heat resistance, frictional resistance, and water absorbing property.

DESCRIPTION OF THE PREFERRED EMBODIMENTS

Figure 1:
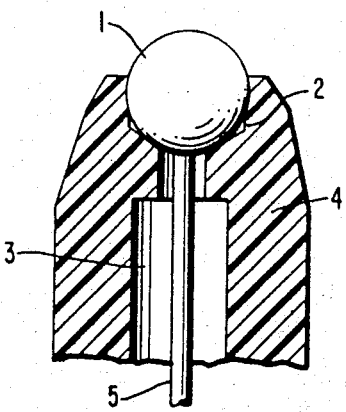
FIGS. 1 and 2 in the attached drawings are sectional views of examples of materials which may be formed utilizing the molding articles of this invention.

The inventors have found that the rigidity and the friction resisting property of a nylon molding remarkably increases, and the water absorbing property thereof can be improved, by a vary simple process with comprises keeping the nylon molding article in a polyisocyanate, a polyisothiocyanate, a polyimine, a polyepoxide, a ketene, a carbodiimide, etc. The inventors have also found that the rigidity and the friction resisting property thereof can be somewhat improved by treating the molding article with monofunctional compounds such as monoepoxides, monoimines, monoisocyanates, monoisothicyanates, ketene, a carbodiimides and the like. It is believed that the improvement in the water absorbing property contributes to the improvement in mechanical strength.

Improved molding articles thus treated have the following uses:

(1) Structural parts; for example, parts which require good resistance to degradation or wearing under friction and high strength, such as gears, cams, and the like.

(2) Sliding parts; such as shaft bearings, rollers, and the like, which must also illustrate a good resistance to the effects of friction.

(3) Miscellaneous; the treated resin of this invention finds special use as the "ball holder" in a ball-point pen. The "ball supporting force" of the holder of this invention is very large. It thus will be possible to employ a synthetic resin holder, which has heretofore been impossible. Further, the resin molding article of the present invention has a good drawing touch, it is inexpensive, and it is fit for mass production techniques.

This invention relates to improvements in nylon molding articles having the above-described characteristics.

According to the process of this invention, since a cross-linking reaction occurs only at the surface layer of the molding article and the inner layers of the molding article remain unreacted, i.e. the inner polyamide layer of the nylon is not reacted with the cross-linking agent or additive. Therefore, molding articles comprising a cured surface and an inner layer having high tenacity can be obtained. Further, this molding article has the characteristic that the water absorbing property thereof is very low, because the surface layer has been treated or reacted.

According to this invention, the water absorbing property and the friction resisting property of a nylon molding are improved by the cross-linking reaction of the amide radical —CONH—.

This invention will now be described in greater detail. A specific nylon molding article is kept in a liquid, a solution or a vapor of an improving agent such as an epoxy, an imine, an isocyanate, an isothiocyanate, a ketene, a carbodiimide, and the like. Then, if desired, excess improving agent is removed. "Nylon" as a term used in this application means thermoplastic polyamide resins, such as nylon 6, 66, 610, 12, and "nylons" illustrating similar characteristics.

If desired, the nylon utilized may include a bulking agent such as glass fibers, metal powders, and others having similar characteristics known to the art. Further, it is possible to carry out the surface treatment of said bulking agents with a silane or a borane, in order to improve adhesion between the bulking agent and the nylon. A suitable silane treatment is described in a co-pending Japanese application Ser. No. 42/54,239 Sho. The borane treatment is a development of the Du Pont Chemical Co., wherein a small amount of the borane is applied to a surface of the fibers by means of a borane treating agent. Any method used in the molding of thermoplastic resins may be used to produce the molding articles of the present invention. For example, extrusion molding, injection molding, compression molding, cutting and vacuum forming are acceptable. The molding articles may be shaped into any structural sliding member, such as a gear, cam, shaft, bearing, etc. The molding articles thus treated by the present invention may be further processed by heat treatment, coating, plating, or any standard prior art processing.

As stated, an object of the treatment of this invention is to produce molding articles which can endure severe conditions without injuring the molding ability of the nylon resin. To accomplish this object, the molding articles may be treated with a homogeneous dispersion system of said improving agent without injuring the shape of the nylon molding articles or the bulking agent included in said nylon molding articles. This dispersion system can comprise the improving agent alone, or a solution of the improving agent in a solvent which does not, or very slightly dissolves the nylon. Catalysts may also be added thereto. The dispersion system can be either liquid phase or gas phase.

The molding articles are treated so as to react at certain prescribed conditions in a dispersion system of the improving agent as described above. The reaction conditions are related to the reaction velocity of the dispersion system of the improving agent and the thickness of the layer which is to be modified by the cross-linking reaction to obtain the desired strength. The conditions also depend on the temperature and the pressure of the system, the treating period, the concentration of the improving agent, the kind of catalyst used and the exact improving agent used. The temperature should be lower than the melting point of the nylon, so as to prevent modification of the molding article.

The improving agents utilized in this invention have high reactivity, react with water, alcohol, etc., and sometimes will even self-polymerize. In addition, isocyanates, isothiocyanates, and imine compounds are poisonous, and have a noxious odor. Therefore, it is necessary to wash the thus treated molding article with a solvent which is inert and which also is not a solvent for nylon.

As the improving agent employed in this process, there are:

(A) EPOXY COMPOUNDS

Compounds containing one or more epoxy radicals

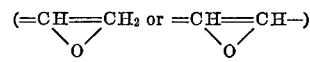

in the molecule. For example, the following compounds:

(1) Monoepoxides by which the addition reaction is carried out:

(1) A glycidyl ether, represented by

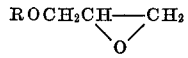

wherein R is, for example, phenyl glycidyl ether, butyl glycidyl ether, and aryl glycidyl ether.

(2) Epoxy unsaturated compounds, for example, octylene oxide, $C_{16}$ olefin oxide, styrene oxide, etc.

(3) Epoxy unsaturated acid esters, for example, butyl epoxy stearate, 2-ethylhexyl epoxy oleate and methyl epoxy ricinolate, etc.

(2) Diepoxides and polyepoxides, by which the cross-linking reaction is carried out, which have two or more epoxy radicals

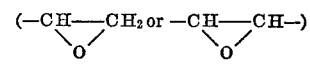

in the molecule, for example:

(a) Polybisphenol glycidyl ethers

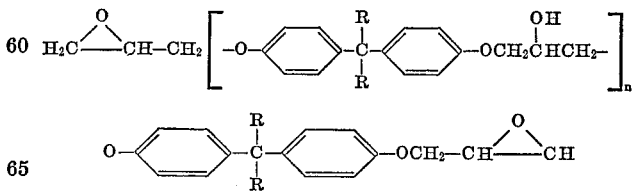

Wherein R represents H or an alkyl radical such as $CH_3$, which is a condensation product of bisphenol and epichlorhydrin. Further, there is the condensation product of epichlorhydrin and a halogen-containing compound, such as chlorine and bromine on the phenylene nucleus in bisphenol, i.e. the so-called halogenated bisphenol A's. This material is a well known epoxy resin, typified by such as Epon 815 and Epon 828 (Shell Co.).

(b) Novolak resins

Novolak-type epoxy compounds represented by the formula:

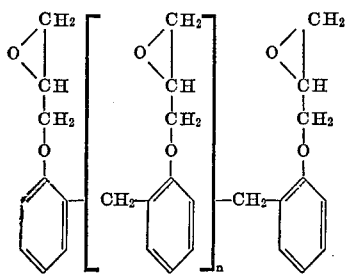

for example, DER–431 and DER–438, made by the Dow Chemical Co.

(c) Other glycidyl ether resins

Polyglycol gylcidyl ether, which is a so-called "plastic epoxy resin," for example DER–732 and DER–736 made by the Dow Chemical Co.

(d) Alicyclic epoxy resins

A series of epoxy resin represented by Unox (made by U.E.E. Co.); Chissonox (made by Chisso Co.), for example Chissonox 201, Chissonox 207 (dicyclopentadiene dioxide) and Chissonox 206 (vinylcyclohexene dioxide), etc.

(e) Other peracetic acid type epoxy resins

Materials produced by epoxidation of an unsaturated compound by the same peracetic acid method utilized in making alicyclic epoxy resins, for example, epoxy polybutadiene and epoxy unsaturated oil, such as Adekanizer–O–130. Epoxy compounds having a low molecular weight are preferable over viscous or solid epoxy compounds. But a viscous or solid epoxy compound may be empoyed by dilution with a solvent with, if needed, catalysts.

(B) IMINE COMPOUNDS (1) Monoimine compounds by which an addition reaction can be carried out, such as: compound represented by the formula

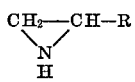

for example, ethylene imine (R=H), propylene imine (R=CH₃) and 2-ethyl ethyleneimine (R=C₂H₅).

(2) Polyalkylene imide compounds by which the cross-linking reaction is carried out, such as: compounds having two or more of the groups

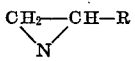

for example,

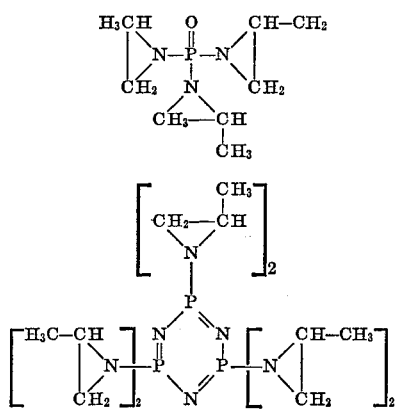

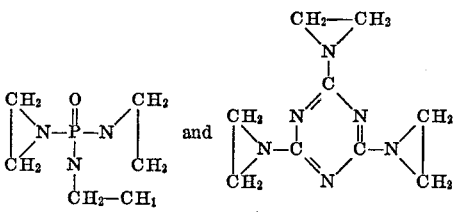

(3) Monoalkylene imide compounds by which an addition reaction is carried out.

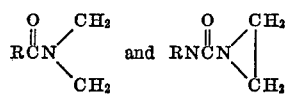

(C) ISOCYANATE COMPOUNDS (1) Monoisocyanate-addition type compounds represented by the formula RNCO, where R is an aliphatic or aromatic radical such as an alkyl radical and an aryl radical.

(a) Aliphatic compounds, for example methyl isocyanate and ethyl isocyanate.
(b) Aromatic compounds, for example, phenyl isocyanate and tolyl isocyanate.

(2) Isocyanate addition, cross linking type compounds having two or more isocyanate radicals (—NCO) in a molecule as:

(a) Aliphatic diisocyanates. Compounds in which two isocyanate radicals are linked with an alkylene radical, for example, hexamethylene diisocyanate.
(b) Aromatic diisocyanates. Compounds in which two isocyanate radicals are linked with a diphenyl methane, diphenyl ether or aromatic nucleus such as naphthalene. For example, diphenyl ether-4,4'-diisocyanate diphenyl methane-4,4'-diisocyanate, 2,4-tolylene diisocyanate xylene diisocyanate and 1,5-naphthalene diisocyanate.
(c) Other acceptable compounds:

Triphenyl methane-4,4',4''-triisocyanate

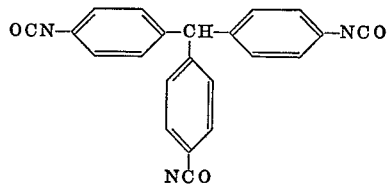

Polymethylene polyphenyl isocyanate

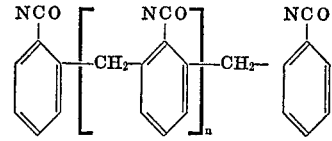

Di or triisocyanate phosphine oxide

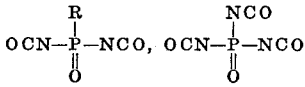

(D) ISOTHIOCYANATES (1) Mono-type compounds having the following formula by which an addition reaction is carried out: R—NCS: such as:

(a) Aliphatic and alicyclic compounds, for example methyl isothiocyanate and ethyl isothiocyanate.
(b) Aliphatic (alicyclic) aromatic compounds, for example phenyl isothiocyanate.

(2) Poly-type compounds by which the cross linking reaction is carried out.

(a) Aliphatic and alicyclic compounds, for example, ethyl diisothiocyanate and hexamethylene diisothiocyanate.
(b) Aliphatic and alicyclic aromatic compounds, for example, phenylene diisothiocyanate and 4,4'-diphenyl methane diisothiocyanate.

(E) KETENES (1) Ketenes with which addition or cyclization are carried out as:

(a) Aldo ketene: R—CH=C=O.
(b) Keto ketene:

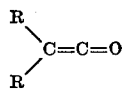

(c) Bis ketene: Carbon suboxide.

(F) BISCARBODIIMIDES

Addition or cross-linking reactions are carried out with the biscarbodiimide, as: Hexamethylene-tert-butyl carbodiimide.

The recation velocity between these improving agents, the nylon and the bulking agent is influenced by the reaction temperature, the concentration of the improving agent, the kind of solvent, the catalyst, the reaction pressure and the reaction period, etc.

(1) Reaction temperature

The treatment of the molding articles by the improving agent is industrially advantageous since cross linking can take place without changing the shape of the molding article. Although it is preferred that the reaction temperature be high, if possible, to increase the reaction velocity, it should be less than the melting point of the nylon molding article, and a temperature lower than 150° C. is preferred. Since the improving agent, for example, tolylene diisocyanate, dissolves nylon 6 at 170° C., the reaction temperature must be less than the temperature at which dissolution and swelling of the nylon results by said improving agent. No lower temperature limits are contemplated in theory. Though it is obvious it is generally required that the treating agent be in liquid form, as incidental, higher temperatures lead to a higher reaction rate. If the improving agent is diluted with a solvent having a low boiling point which has no influence upon the nylon and the treatment is carried out at the boiling point of said solvent, the effect due to dissolution and swelling decreases.

(2) Concentration of the improving agent and the type of solvent

Any solvent which does not swell or dissolve the nylon can be used. In general, reaction velocity decreases by the use of a solvent. The most preferred solvent-treating agent combinations are as follows:

(1) As the solvent for epoxy compounds: Nitrobenzene, dioxane, ketone, acetate, etc.
(2) As solvents for imine compounds, there are water and alcohols. These solvents are not always suitable for all nylons, for example, toluene is suitable for nylon 6, but swells nylon 12. Chlorobenzene is more preferable than xylene as a solvent for diphenylmethane-4,4'-diisocyanate.
(3) Toluene is a solvent for tolylene diisocyanate when nylon 6 is used; diethylether and di-n-butyl ether solvents for phenyl isocyanate; dioxane and toluene for aromatic isocyanate; and benzene and toluene for all isocyanates.
(4) Ether, acetone, chlorobenzene and anisol are solvents for diisothiocyanate.
(5) Ether, toluene and toluene-water as solvents for bisketenes.
(6) Tetrahydrofuran, toluene, dimethylformamide, dioxane and benzene as solvents for biscarbodiimides.

(3) Catalysts

The improving agent of the invention is very reactive, but the amide radicals of the nylon are not so reactive. Accordingly, the catalyst utilized has a great influence upon the reaction. Some of the preferred improving agent-catalyst combinations of the present invention are set out below.

(1) Epoxy compounds. Tri-n-butylamine, n-butyl lithium, pyridine, $BF_3$ and amine curing agent.
(2) Imine compounds. A basic catalyst is effective, such as $CH_3ONa$ and triethyl amine.
(3) Isocyanate. An organic tin compound is preferable, such as dibutyl tin diacetate, but compounds such as triethylene diamine are operable.
(4) Isothiocyanate. Iron acetyl acetonate, dibutyl tin dilaurate, and the like.

(4) Reaction pressure

When the improving agent is employed as a solution, the reaction pressure has no influence upon the reaction. But when the improving agent is employed as a gas, a higher pressure is preferable, i.e. above atmospheric.

(5) Reaction time

The reaction time depends on the reaction velocity based on conditions (1)–(4) heretofore discussed. Diffusion of reaction from the surface layer to an inner layer of the nylon, as in cementation of metals, occurs. Accordingly, a long period of time, for example 10 hours, is required in order to advance the reaction into the inner layer of the nylon molding article.

(6) Post washing

After reaction, it is preferable to remove these improving agents by washing, because some of them have poisonous characteristics. In such a case, washing may be carried out in the solvent, for example, by ultrasonic washing, etc.

The following examples are offered to more completely illustrate the present invention.

EXAMPLE 1

A molding article which had been produced by adding 30% by volume of a 300 mesh dehydrated Fe powder treated with a 1% aqueous silane solution (in an amount of 0.3% by weight based on the Fe powder) into nylon 6 and molding the mixture in the shape of a ball holder of a ball-point pen having a hollow part 2 for inserting a ball 1 and an ink groove 3 as shown in FIG. 1, was heated in the following treating liquid at the boiling point of methylethyl ketone, that is 79° C. for two hours. After removal, the article was heated at 130° C. for an hour.

Treating liquid

| | Parts |
|---|---|
| Epicort 154 | 20 |
| $BF_3$-pyperidine complex | 1 |
| Methylethyl ketone | 100 |

| | Before treatment | After treatment |
|---|---|---|
| Elongation, percent | 7 | 4 |
| Tensile strength, kg./cm.² | 750 | 300 |
| Ball-point pen holder supporting force, g | 80 | 200 |

EXAMPLE 2

A molding article which had been produced by adding 30% by volume of a dehydrated Fe powder having a 300 mesh size (treated with a 1% aqueous solution of a silane treating agent in the amount of 0.3% by weight based on the Fe powder) and 1% of graphite into nylon 6, and molding in a holder as shown in FIG. 1, was dipped into a solution produced by adding 0.001 mol (based on the amide radicals of nylon 6) of dibutyl tin acetate to a 20% toluene solution of a mixture of 2,4- and 2,6-tolylene diisocyanate (TDI). The molded article was treated at 110° C. for seven hours in this solution and was then treated by ultrasonic washing in toluene. Characteristics of the treated molding article are shown in the following list:

|  | Non-treated | Treated |
|---|---|---|
| Breakage elongation, percent | 7 | 4 |
| Breakage tensile strength, kg./cm.$^2$ | 700 | 750 |
| Ball-point pen ball supporting force, g | 70 | 200 |

The ball-point pen ball supporting force represents the weight required to push out the ball 1 by projecting a pin 5 in the ink groove 3 of the holder 4 having a hollow opening 2 for inserting the ball 1 and the ink groove 3 (as shown in FIG. 1).

EXAMPLE 3

Identical nylon molding articles as in Example 2 were treated with 100% phenylene diisocyanate at 100° C. for two hours, four hours and eight hours, respectively. The improvement in friction resisting property is shown in the following table.

Friction by Okoshi type friction tester: load 6.6 kg., velocity 0.05 m./second running distance 200 m., non-lubricating.

|  | 2 hours | 4 hours | 8 hours |
|---|---|---|---|
| Non-treatment, mm | 4.0 | 4.0 | 4.0 |
| Treatment, mm | 3.0 | 2.5 | 2.0 |

EXAMPLE 4

Molding articles comprising nylon 12 and the bulking agent of Example 7 was treated with 100% tolylene diisocyanate at 50° C. for 1 hour, 2 hours and 30 minutes, respectively. The increase in the weight of the resultant molding article is shown in the following table.

Increase of weight: Percent
- 30 minutes --- 2
- 1 hours --- 3
- 2 hours --- 8

EXAMPLE 5

Figure 2:
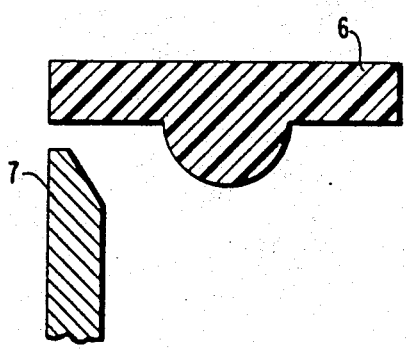

The cam 6 shown in FIG. 2 of the drawings was treated for seven hours by the same procedure as in Example 2. In FIG. 2, member 7 is a sliding member for the cam, the sliding member being made of steel (SK 7). The abrasion depth of the cam after treating at load 500 g., 20 c.p.m., $10^7$ times is shown in the following table, wherein the mineral oil #200 was used for initial lubricating.

Mm.
- Non-treatment --- 0.5
- Treatment --- 0.1

EXAMPLE 6

A nylon molding article produced as in Example 2 was treated with a 100% hexamethylene diisocyanate solution, including 0.01 mol of iron acetyl acetonate (based on the amide radical in the nylon) at 100° C. for 6 hours. The ball supporting force thereof was 150 g. with the ball holder of FIG. 1.

EXAMPLE 7

A molding article (150 2.5 3 mm.) produced by mixing nylon 66 and 30% by volume of copper powder (300 mesh) was immersed at room temperature for one hour, and then heated at 40° C. for 30 minutes in the following treating liquid:

A 10% toluene solution of carbon suboxide was used. The results were as follows:

|  | Before treatment | After treatment |
|---|---|---|
| Tensile strength, kg./cm.$^2$ | 700 | 800 |
| Elongation, percent | 7 | 3 |
| Water absorbing property, percent | 0.7 | 0.4 |
| Okoshi type friction, mm$^1$ | 3.0 | 2.1 |

$^1$ Condition : Load 6.6 kg., velocity 0.05 m./second, running distance 200 m., no lubricating.

EXAMPLE 8

A nylon molding article produced as in Example 7 was heated in a 20% tetra-hydrofuran solution of hexamethylene bis-tert-butyl carbodiimide at 80° C. for five hours. The results were as follows:

|  | Before treatment | After treatment |
|---|---|---|
| Water absorbing property, percent | 0.7 | 0.5 |
| Okoshi friction test, mm | 3.0 | 2.0 |

What is claimed is:

1. A nylon article having an addition or cross-linking reaction product layer in a surface region thereof which is produced by treating the nylon article with a member selected from the group consisting of an epoxy compound, an isocyanate compound, a ketene and a carbodiimide, wherein said layer is present only in said surface region of said nylon article extending from the surface into said nylon article wherein the nylon constituting said article has an inorganic bulking agent incorporated therein, said bulking agent being selected from the group consisting of silane-treated metal powders and borane-treated glass fibers.

2. A process for producing a treated nylon article which comprises heating a molded nylon article in a fluid comprising a member selected from the group consisting of an epoxy compound, an isocyanate compound, a ketene and a carbodiimide in the presence of a catalyst selected from the group consisting of tri-n-butylamine, n-butyl lithium, pyridine, BF$_3$ and an organic tin compound.

3. The nylon article of claim 1 wherein said addition or cross-linking reaction product layer is produced by treating said nylon article with an imine compound selected from the group consisting of monoimine compounds, polyalkylene imide compounds and monoalkylene imide compounds.

4. The process of claim 3 wherein said heating is conducted in the presence of a basic catalyst selected from the group consisting of triethylamine and CH$_3$ONa.

5. The process of claim 2 wherein said nylon article is treated with an isothiocyanate compound and wherein said catalyst is iron acetyl acetonate or dibutyl tin dilaurate.

6. The process of claim 2 wherein said fluid is a gas and wherein the pressure of heating is superatmospheric pressure.

References Cited
UNITED STATES PATENTS

| 2,891,511 | 6/1959 | Fehling | 120—42.4 |
| 2,893,898 | 7/1959 | Evans et al. | 117—138.8 X |
| 3,268,467 | 8/1966 | Rye et al. | 117—138.8 X |
| 3,420,726 | 1/1969 | Schrader et al. | 156—314 |
| 3,023,126 | 2/1962 | Underwood et al. | 117—118 X |
| 3,379,561 | 4/1968 | Manaka | 117—118 X |
| 3,455,725 | 7/1969 | Jex et al. | 117—161 X |
| 3,420,726 | 1/1969 | Schrader et al. | 156—314 |

E. G. WHITBY, Primary Examiner

U.S. Cl. X.R.

117—138.8 N, 160 R, 161 R, 161 P, 161 UZ, 161 UA, 1612 A, 1612 B, DI 8.7; 161—93; 264—111; 401—208